United States Patent [19]

Eistrat

[11] Patent Number: 4,534,111

[45] Date of Patent: Aug. 13, 1985

[54] COMBINED CHAIN SAW AND POSITIONING TOOL

[76] Inventor: Thomas Eistrat, 1020 S. Almansor St., Alhambra, Calif. 91801

[21] Appl. No.: 334,414

[22] Filed: Dec. 24, 1981

Related U.S. Application Data

[63] Continuation-in-part of Ser. No. 182,377, Aug. 29, 1980, abandoned.

[51] Int. Cl.[3] .............................................. B23D 59/00

[52] U.S. Cl. .......................................... 30/371; 30/382

[58] Field of Search .................................. 30/371, 382

[56] References Cited

U.S. PATENT DOCUMENTS

| | | | |
|---|---|---|---|
| 2,665,719 | 1/1954 | Pennanen | 30/371 |
| 2,708,953 | 5/1955 | Diehl | 30/371 |
| 2,821,213 | 1/1958 | York | 30/371 |
| 2,925,105 | 2/1960 | Hayden | 30/371 |
| 3,931,676 | 1/1976 | Merle | 30/371 |
| 4,143,460 | 3/1979 | Shean | 30/371 X |

*Primary Examiner*—James G. Smith

[57] ABSTRACT

This invention relates to a safer and better power tool for cutting wood. It combines a power driven bar type chain saw and a work positioning means to make the saw also a tool for moving wood to be cut into a better and safer position for cutting before cutting. There are a very large number of chain saw accidents. These accidents are primarily caused by inexperienced operators cutting wood from an unsafe position. They overreach and otherwise unsafely cut wood primarily because they don't take the time to set their saw down and with their hands move wood to be cut into a safe position before cutting. They haven't had a tool with them to use for safely moving wood before they cut it. The invention herein makes the bar type chain such a tool in addition to being a saw. The attachment extends lengthwise from the nose of any type guide bar on the saw, and having at least one hook and point extends the users reach and also enables the user to use the chain saw as a tool to move wood into a safe position for cutting without setting down the saw or stepping from the users position. The attachment also prevents kickback, chain damage by preventing the chain from hitting ground, aids limbing, and also aids attaching the guide bar and chain to the engine or motor and the tensioning of the chain.

4 Claims, 5 Drawing Figures

FIG. 1
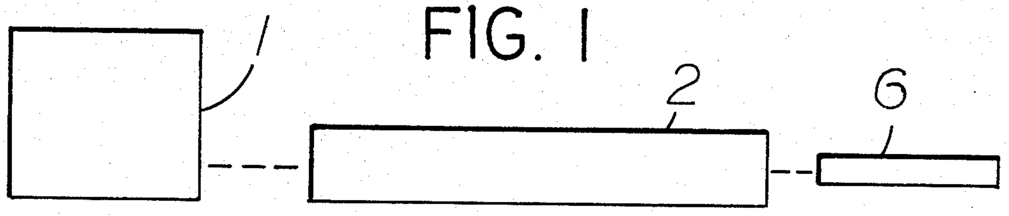
FIG. 2
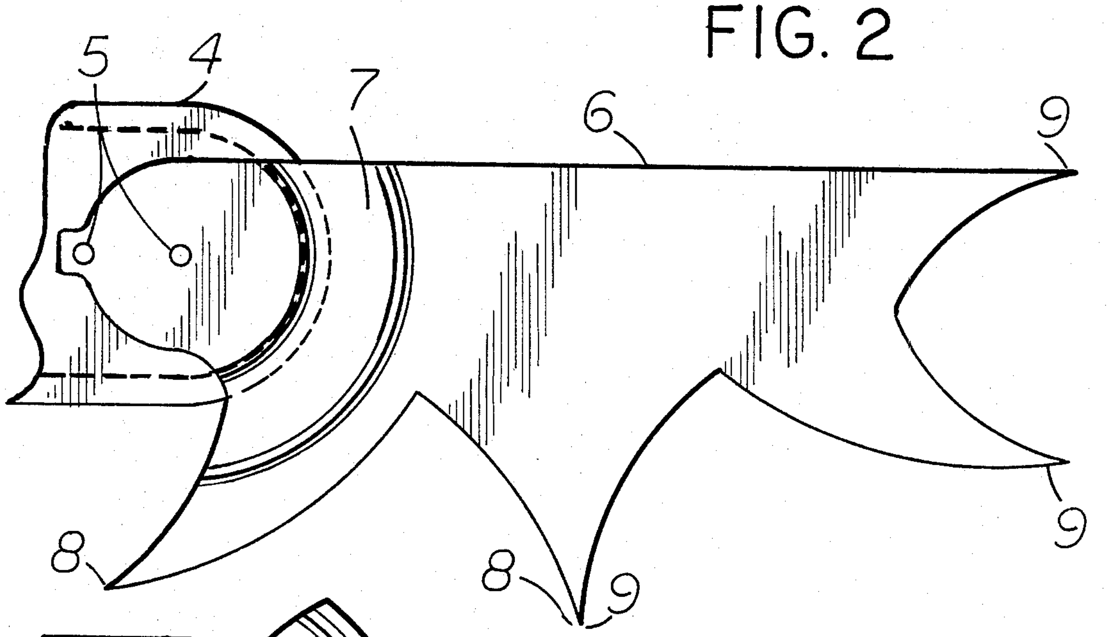
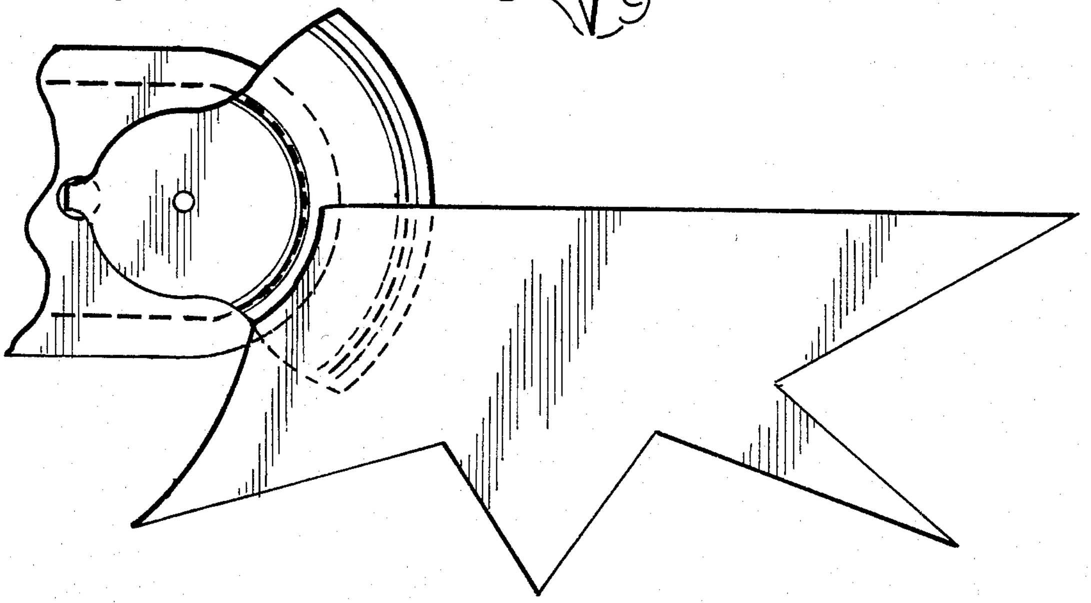
FIG. 3

COMBINED CHAIN SAW AND POSITIONING TOOL

This is a continuation-in-part of application Ser. No. 182,377, filed Aug. 29, 1980, now abandoned entitled Combined Chain Saw and Positioning Tool.

FIELD OF THE INVENTION

This invention relates to a portable power driven bar type chain saw and a tool means so that the chain saw may also be used as a positioning device for moving, pushing, or pulling objects out of the way or for moving, pushing, or pulling a workpiece, such as firewood, into a better position before cutting with the chain saw.

BACKGROUND OF THE INVENTION

Power driven chain saws are very dangerous to use, particularly for the tens of thousands of new users cutting firewood. The user of a bar type chain saw will often hold the saw either too close or too far from the wood being cut, or otherwise cutting in an unsafe position, because he wants to avoid setting the saw down and moving himself or the workpiece (wood) to a safer and better position for cutting.

A very large number of chain saws are now being used. In the United States and Canada in 1979 combined sales for both countries of gasoline powered chain saws were No. 2,940,999; while estimated electric powered chain saw sales were 800,000. Most of these were for bar type chain saws.

The art prior to the invention herein also shows that chain saw accidents occur primarily with the millions of new users of chain saws cutting firewood. In California in 1979, for example, there were only about one percent of the accidents with professional chain saw users, while about ninety-nine percent of the accidents were with the occasional firewood cutter.

The United States Forest Service, Pacific Southwest Region, in their publication "Cutting Firewood on the National Forests in California", issued in 1980, emphasizes the dangerous propensities in using a chain saw as follows:

> "Safe handling of your chain saw is essential. Injuries in California rose from 13,000 in 1971 in 1971 to 53,000 last year, due mainly to increased woodcutting by people inexperienced in using a chain saw."

Extrapolating this data shows over 500,000 users in the United States alone are injured yearly in chain saw accidents. These accidents occur primarily with users not safely positioning each piece of wood before cutting.

There has been no structure with an object or function in any prior art in bar type chain saws, or attachments thereto, to combine a means with the chain saw so that the chain saw may also be used as a positioning tool for moving, pushing, or pulling objects out of the way; or for moving, pushing, or pulling a workpiece, such as firewood, into a better position before cutting the workpiece with the chain saw.

SUMMARY OF THE INVENTION

It is therefore an object of the invention to combine a portable bar type chain saw with a work positioning device; the combination comprising a motor for driving a chain on a guide bar and a work positioning means connected to the guide bar generally near the front (nose) end thereof, and projecting generally forwardly therefrom, the positioning attachment means having a least one hook and forward point at a position beyond the front tip of the guide bar so that the chain saw may also be used as a positioning device (tool) for the function of moving, pushing, or pulling objects out of the way of a workpiece; or for moving, pushing, or pulling a workpiece, such as firewood, into a better or unoverreached position without setting down the saw and before cutting with the chain saw; thereby to overcome the above stated accident problem in the prior art. The words front (nose) end, nose, front end, front tip, and tip are defined herein to be equivalent in meaning.

It is another object of the invention that it be an integral part of the guide bar or that it be a removable attachment on the guide bar.

It is another object of the invention that if there is a helper's handle or a nose guard on a guide bar on a chain saw, the aforesaid positioning means is modified to be integral with or attachable to the helper's handle or nose guard; so that the combination can be used with the chain saw for safer positioning a workpiece before cutting with the chain saw.

It is also an object of this invention that the work positioning device when it is attachable and removable from a guide bar, that the means for attachment of the work positioning device on the guide bar be the same means as any of the well known structural means as on helper's handles or nose guard chain saw attachments.

Substantial advances in chain saw guide bars have been effected in not only guide bars milled from a single piece of steel without roller or sprocket tip nose, but also in contributions such as evidenced by others in the following U.S. patents and those cited therein: Scott-Jackson at al 4,259,783 of 4/81, Harada 4,138,813 of 2/79, Arff 4,021,913 of 5/77, Gibson 3,987,544 of 10/76 and Tobarz 3,949,475 of 3/75. It is an object of this invention to provide the workpiece positioning means of the invention on any type of guide bar, including the foregoing.

In addition to making a guide bar chain saw a tool for safely positioning wood before cutting, another benefit of the invention is kickback and chain damage prevention, and in some embodiments means for safer and faster limbing. Another benefit of this invention is that it can provide a support to make attaching the guide bar and chain onto the chain saw engine and also make tensioning the chain easier for the non-professional user.

BRIEF DESCRIPTION OF DRAWINGS

FIG. 1 is a block diagram of an embodiment of a portable bar type chain saw combined with this invention of a work positioning device to make the combination a means for moving objects out of the way of work to be cut and for moving a workpiece into a safer and unoverreached position before cutting, all without setting down the saw or stepping for the users position. Block 2 is any type of guide bar and chain conventionally attachable to a gasoline engine or electric motor an engine or motor block 1 for driving the chain. Block 6 is the work positioning means for this combined saw and work positioning means, and is shown extending lengthwise beyond and for attachment on the nose of the conventional bar block 2. In this embodiment work positioning device block 6 is attachable (attachable details not shown) to the nose of the guide bar in block 2 by conventional means such as those for helper's handles or nose guard attachments.

FIG. 2 is a side elevation view of an embodiment showing only the nose end of a guide bar of a bar type chain saw, and showing a work positioning means of this invention that is attached to the nose of the guide bar. The reference numbers are described in the description of the following preferred embodiment and shown on FIG. 4.

FIG. 3 is a side elevation of another embodiment of this invention and shows the positioning means attached (by spot welding, not shown) to a nose guard attachment which is attached to the nose of a guide bar on a chain saw (engine, chain, and other portions of guide bar not shown). .

DESCRIPTION OF A PREFERRED EMBODIMENT

Figure 4:
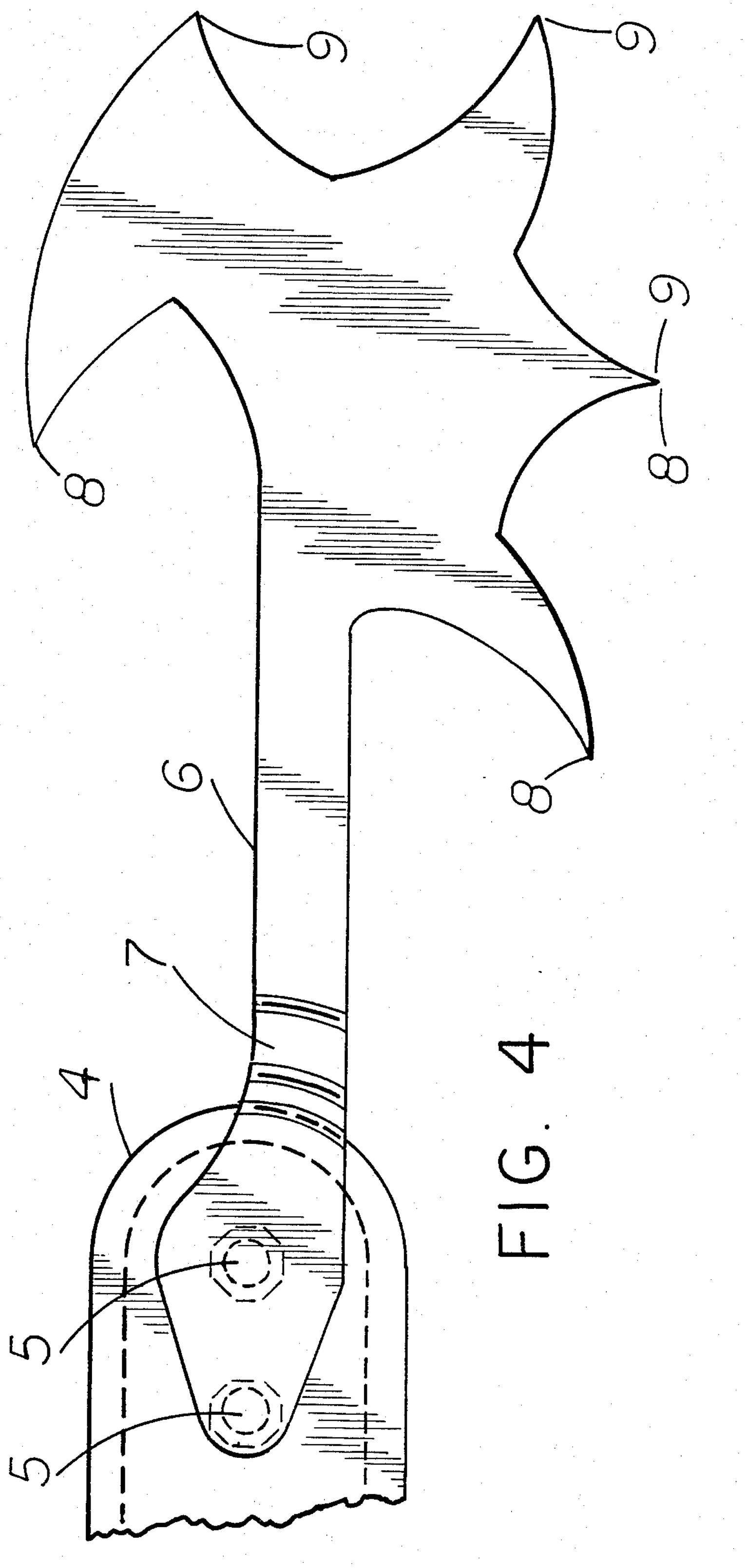
FIG. 4 is a side elevation of a presently preferred embodiment according to the invention with the engine, chain, and part of the guide bar not shown for simplification of the illustration.

FIG. 4 is a side elevation of a presently preferred embodiment of the invention; with engine, chain, type of guide bar, and most of the guide bar excluded for simplification of the illustration. The nose 4 of a chain saw guide bar block 2 has two holes (not shown) sized and spaced for attachment from fasteners 5 of work positioning device 6. Work positioning device means 6 is preferably a stamping longitudinally ribbed for lightweight and strength, with offset clearance 7 for clearance from the chain (chain not shown). The work positioning device 6 has pointed hooks 8 and points 9. The chain saw with attached positioning means 6 can be used as a tool to engage and move with the pointed hooks 8 and or points 9 objects out of the way for safe cutting; or move, push or pull a workpiece, such as firewood, into a better position before cutting with the chain saw; all with or without setting the saw down or stepping from the users position. The combined tool extends the reach of the user substantially beyond the reach of a chain saw user who does not have this work positioning device on his chain saw.

Figure 5:
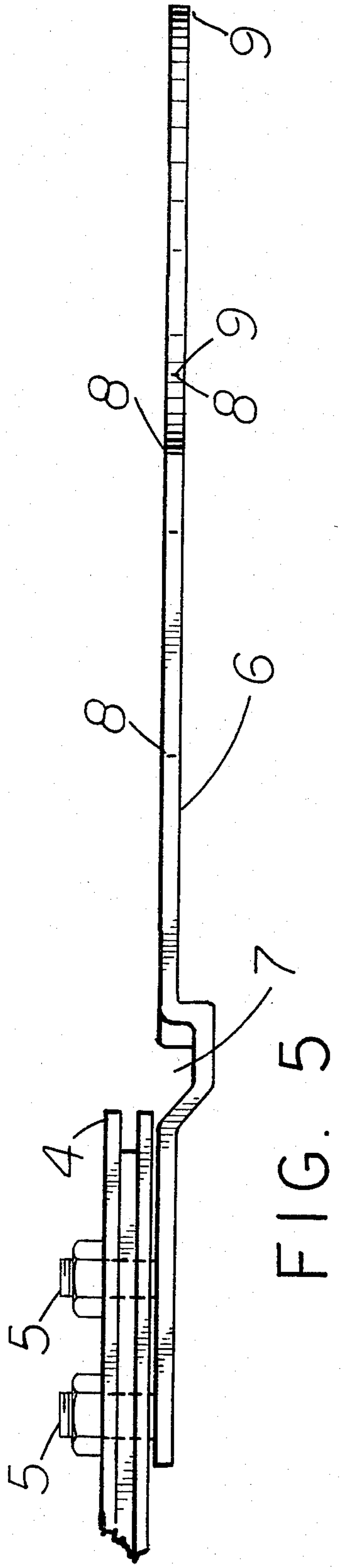
FIG. 5 is a plan view of the parts shown in FIG. 4.

FIG. 5 shows a plan view of FIG. 4 showing an fasteners 5 and the chain clearance offset 7.

This invention having been described in a preferred embodiment, it is clear that it is susceptible to numerous modifications and embodiments within the ability of those skilled in the art and without the exercise of the inventive faculty. Included in such modifications and embodiments are the number of hooks and points, the means and mounting of the positioning device on either or both sides of a guide bar, shape of the hooks and points, type of metal and form of attachments as being made of rod rather than a milled sheet or stamping, and numerous other embodiments within the scope of the invention.

What is claimed is:

1. A portable bar type chain saw combined with a work positioning device, comprising:

a motor; for driving a chain; on a guide bar having an end attachable to the motor and a front end; and a work positioning device connected to the guide bar generally near the front end thereof and projecting generally forwardly therefrom, the work positioning device having at least one hook thereon at a position beyond the front end of the guide bar so that the chain saw combined with the work positioning device may be used for cutting as a chain saw, or for a tool function of moving, pushing, or pulling one or more objects out of the way of a workpiece to be cut before cutting the workpiece; or for moving, pushing, or pulling a workpiece, such as firewood that is unreachable for safely cutting with a chain saw not having an attachment of the work positioning device but is reachable with attachment of the work positioning device for movement into a safer and unoverreached position before cutting the workpiece with the chain saw; and means for combining the work positioning device with the guide bar for the work positioning device tool function.

2. The product described in claim 1, further comprising: at least one point projecting generally forwardly from the work positioning device so as to aid in the tool function of the work positioning device chain saw combination.

3. In a tool for the safer cutting of wood with a bar type power chain saw with a chain guide bar, wherein the improvement comprises:

a work positioning device for connection to the chain guide bar with a front tip and connection of the work positioning device generally near the fronttip and projecting generally forwardly therefrom, the work positioning device having at least one pointed hook and having generally forwardly at least one point projecting generally forwardly at a position beyond the front tip, for the function of moving an object that is unreachable for safely cutting without a chain sawer user moving from his standing position unless the object is first moved into a safely reachable for cutting position with the work positioning device combined with the chain saw; and means for attaching the work positioning device to the chain guide bar for the function of making a tool for the safer positioning of wood for cutting.

4. The produce described in claim 3, further comprising: the work positioning device in an integral part of the guide bar.

* * * * *